Figure 1:
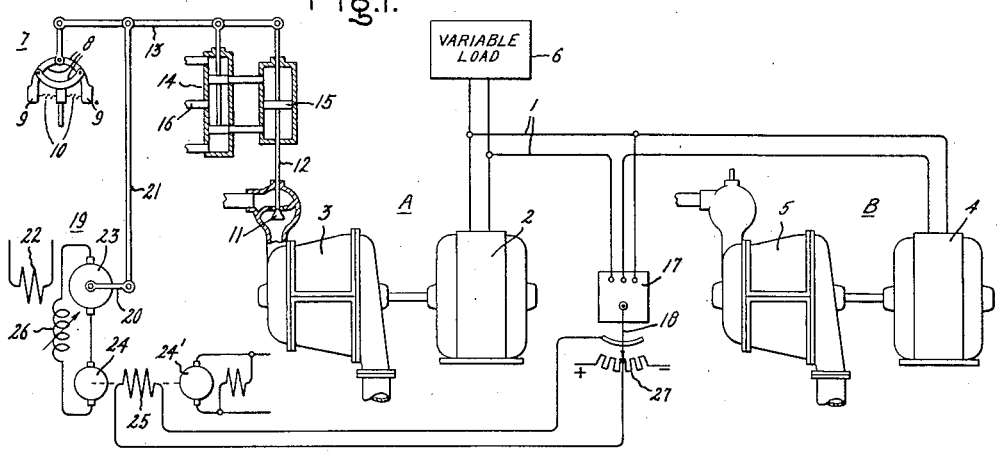

Aug. 18, 1942.   S. B. CRARY ET AL   2,293,492
AUTOMATIC LOAD REGULATOR
Filed Feb. 3, 1942

Inventors:
Selden B. Crary,
Harold S. Shott,
Charles Concordia,
by Harry E. Dunham
Their Attorney.

Patented Aug. 18, 1942

2,293,492

UNITED STATES PATENT OFFICE 2,293,492

AUTOMATIC LOAD REGULATOR

Selden B. Crary, Harold S. Shott, and Charles Concordia, Schenectady, N. Y., assignors to General Electric Company, a corporation of New York Application February 3, 1942, Serial No. 429,387

19 Claims. (Cl. 290—4)

This invention relates to improvements in automatic electrical load regulators and more particularly to improvements in tie line load regulators.

A tie line may be defined for present purposes as an electrical transmission line which interconnects two alternating-current power generating systems, each of which normally supplies power to a load or loads of its own. The line itself may be of any suitable type, such as an overhead line or a buried cable line, and it could be a bus bar if the generating systems are close together as would be the case if they were separate alternators in the same generating station. The usual purpose of a tie line is to transmit power from one generating system to the other so as to help said other system carry its load. Each generating system may comprise one prime mover driven generator but usually it includes a plurality of such units operating in parallel. The tie line power flow may always be in one direction or it may reverse from time to time.

It is usually desirable to regulate the power flow through a tie line. For example, one system may agree to supply the other with a definite amount of power and the agreement may provide a penalty in case this amount is exceeded or in case the integrated amount over a predetermined time (maximum demand) exceeds a given value. This regulation may be accomplished manually or automatically. If the load fluctuations on the system which is receiving tie line power are a large fraction of the capacity of this system and if they occur frequently, manual regulation will often be too slow to be satisfactory. On the other hand, too fast automatic regulation has been found to cause instability which is characterized by large power surges and may be followed by loss of synchronism between the systems.

Tie line power may be regulated by suitably controlling the electrical output of either one or both of the generating systems which are interconnected by the tie line. Usually, however, it is the tie line power receiving system whose output is controlled so as to regulate the tie line power.

In accordance with one aspect of this invention certain criteria have been discovered and certain optimum automatic tie line regulator settings have been determined which make it possible to operate either up to the border line of instability or with minimum power swings or surges.

By an "automatic tie line load regulator" is meant the primary means responsive to tie line power, the prime mover throttle or its equivalent and all the intermediate mechanism and linkages whereby the primary means controls the throttle position. Most prime movers are already provided with automatic speed governors comprising suitable primary speed responsive means, such as a conventional spring restrained centrifugal fly ball mechanism (or an oil pump working against a spring loaded diaphragm or a resonant circuit), the prime mover throttle and the necessary intermediate governor mechanism whereby the primary speed responsive means controls the governor position so as to maintain substantially constant speed. Such governor mechanisms are usually provided with means for adjusting the governor speed settings, such as a so-called synchronizing motor which applies an adjustable bias to the speed responsive means so as to cause it to hold different speeds. In order to avoid duplication of parts and unnecessary expense tie line regulators usually make use of this adjusting means including the throttle and the governor mechanism therebetween. They thus include a tie line load controller for actuating the governor adjusting means in such a direction in accordance with deviations in tie line watts from a predetermined value as to maintain substantially constant tie line power.

Both the tie line load controller and the governor are amplifiers in the sense that a small change in input produces a large change in output. For example, a small sustained change in tie line watts will eventually cause the tie line controller to produce a governor bias corresponding to a large change in tie line watts. Similarly, a small sustained change in speed will eventually cause the governor to produce a large change in prime mover power output. When an amplifier is also a regulator its amplification factor is inversely proportional to its regulation. Thus, a high amplification factor corresponds to a sensitive regulator, i. e., one with good or nearly flat regulation whereas a low amplification factor corresponds to an insensitive regulation, i. e., one having poor or drooping regulation. Another characteristic of amplifier-regulators implied by the word "eventually" in the above description of their action is time lag or time delay. Each such device has a certain time lag between the variation of its input and the resulting variation of its output.

The optimum regulator settings which are referred to above are defined in terms of the controller and governor regulations and time lags and of an inertia constant of the controlled prime-mover-alternator set which will be defined hereinafter.

In accordance with another aspect of the invention there is provided a new and improved form of tie line load controller which is particularly well adapted to having the above-mentioned optimum settings.

An object of the invention is to provide a new and improved automatic tie line load controller.

Another object of the invention is to provide an automatic tie line load controller which has a certain optimum setting from the point of view of stable operation with fast and accurate operation.

Another object of the invention is to provide an automatic tie line load controller which has a certain optimum setting from the point of view of minimum power swings or surges with fast and accurate regulation.

The invention will be better understood from the following description taken in connection with the accompanying drawing and its scope will be pointed out in the appended claims.

Figure 2:
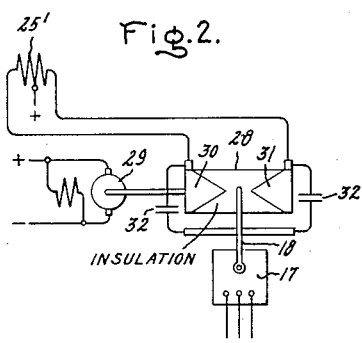
Figure 4:
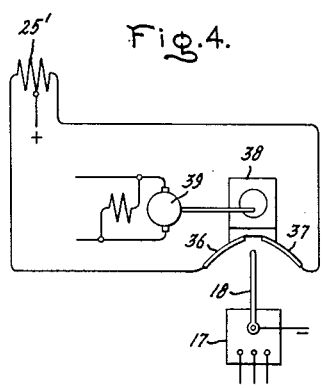
Figure 3:
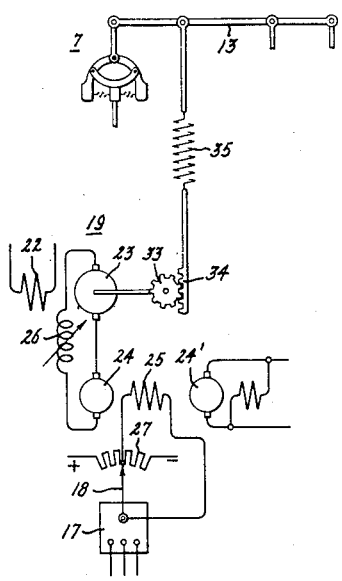
Figure 5:
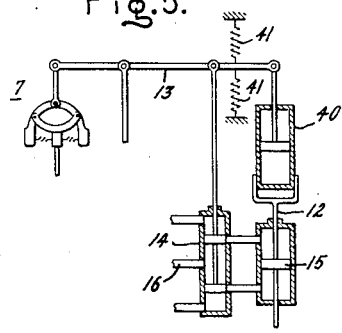

In the drawing, in which like reference characters designate similar elements throughout the several figures, Fig. 1 illustrates schematically what may be called a continuous proportional type automatic tie line load control system which embodies the features of this invention, Fig. 2 is a similar view of a modification which may be called an intermittent proportional-type tie line controller, Fig. 3 is another modification showing what is called a continuous floating-type controller, Fig. 4 shows an intermittent floating-type controller and Fig. 5 illustrates droop correcting means which may be used with any of the governors shown in the preceding figures.

Referring now to the drawing and more particularly to Fig. 1, there is shown therein an alternating-current power system comprising a generating system A and a generating system B which are interconnected by a tie line 1. System A comprises an alternating current generator or alternator 2 driven by any suitable prime mover 3, such for example as a steam turbine, while similarly generating system B comprises an alternator 4 driven by a prime mover 5 of any suitable type. While each alternator may be and usually will be connected to supply current to various local loads (not shown), the generator 2 has connected thereto a relatively large variable load 6 whose power requirements may vary very rapidly over a wide range. An example of such a load is a steel strip mill.

Each of the prime movers is provided with an automatic speed governor of any suitable type. The essential elements of one suitable type of governor are shown in connection with prime mover 3 and it will be assumed that prime mover 5 is provided with a similar governor. As shown, this governor comprises primary speed responsive means in the form of a spring-restrained centrifugal flyball mechanism 7 which is driven by the prime mover shaft. The arrangement is shown as comprising three pivotally connected links 8 arranged to form a linkage with centrifugal weights 9 attached to opposite pivot points and with tension springs 10 interconnecting these weights. The whole mechanism rotates about a vertical axis so that the action of centrifugal force on the weights 9 tends to move the uppermost pivot point, as viewed in the drawing, downwardly and the opposing action of the springs 10 tends to move this point upwardly, as viewed in the drawing. Arranged to be controlled by the speed responsive motion of this upper pivot point is a throttle or inlet valve for the turbine 3. This valve is shown schematically as a needle valve 11 although it will, of course, be understood that any other suitable throttle means may be employed. It is actuated by a rod 12, upward movement of which, as viewed in the drawing, tends to close the throttle and reduce the turbine speed while downward movement tends to open the throttle and increase the turbine speed. The upper pivot point of the primary speed responsive means and the throttle rod 12 are interconnected by a link or rod 13 pivotally attached to each of these elements.

As the throttle requires a substantial amount of power to operate it and as the operation of the throttle directly by the speed responsive means would produce very poor regulation, auxiliary power amplifying means is provided. This means is under control of the primary speed responsive means and produces the actual force necessary to operate the throttle. It is shown as a pilot valve 14 pivotally connected to an intermediate point on the link 13. This pilot valve 14 controls the application of fluid under pressure to one side or the other of a main operating piston 15 which is attached to the throttle rod 12. The operating fluid may be oil and it is admitted between the two parts of the pilot valve 14 through an opening 16.

With this arrangement if the speed of the prime mover 3 should fall for any reason, such as because of an increase in load on its generator or because of a decrease in steam pressure, the centrifugal weights 9 will tend to move toward each other thereby moving the left-hand end of the link 13 upwardly. As pilot valve 14 is moved more easily than the main throttle valve 11 and the link 13 will pivot about its connection to the throttle rod 12. This will consequently move the pilot valve 14 upwardly thereby simultaneously admitting fluid pressure to the upper side of the piston 15 and connecting the lower side of the piston 15 to an outlet passageway. This forces the piston 15 downwardly thereby to open the throttle 11 and increase the turbine speed. The downward movement of the throttle rod 12 acts to return the pilot valve to its neutral posiiton. If the accompanying change in turbine speed is enough to satisfy the primary speed responsive means the governor mechanism will come to rest; otherwise it will continue operating until a new balance has been obtained. In a like manner, an increase in turbine speed will cause the pilot valve 14 to be moved upwardly thereby causing the piston 15 to be moved upwardly to move the throttle in a closing direction and this upward or closing motion will also carry the pilot valve along with it so as to restore the pilot valve to its neutral position.

Such a speed governor is an amplifier in that a small change in speed of the primary speed responsive device will cause the throttle to change its position sufficiently to cause a power input change to the turbine which is equivalent to a relatively large change in speed. This amplifying characteristic in automatic regulators or governors is usually defined quantitatively in terms of the governor regulation. For example, a six per cent governor regulation means that a six per cent change in speed of the turbine or primary speed responsive means will result in a one hundred per cent change in throttle position or, in other words, a change in throttle position from full open to full closed or vice versa depending upon whether the speed change is a decrease or an increase. More accurately this regulation is defined as the change in prime mover speed from full speed which accompanies a full load change on the prime mover divided by full speed. In other words, if the prime mover is operating at full speed no load and full load is applied, the speed will drop due to the governor regulation and the difference between no load speed and full load speed divided by no load speed is the quantitative value of the governor regulation. This regulation will be designated by the symbol $R_g$.

The governor also has a certain amount of inherent time lag. For example, the centrifugal weights 9 have a certain amount of inertia which causes a definite time lag between a change in prime mover speed and a change in position of the pilot valve 14. Also the operating fluid controlled by the pilot valve 14 has a certain limited rate of flow and the throttle mechanism for the prime mover has a certain amount of inertia, both of which effects cause definite time delays between motion of the pilot valve 14 and corresponding motion of the throttle. In addition, the operating fluid for the turbine has a definite amount of inertia and limited rate of flow so that there is a definite time interval between a change in throttle position and the change in prime mover shaft torque. The sum of all these time lags, i. e. the overall governor time lag, will be designated by the symbol $\Sigma T_g$.

As previously explained, it is often desirable to regulate the power flow in the tie line 1 so as automatically to maintain it as a predetermined value. This cannot be done by merely setting the speed governors of the prime movers at predetermined values and then leaving them alone because under such conditions the alternators 2 will tend to share any change in total load on the system in accordance with the regulations of their respective governors.

A suitable automatic tie line controller may consist of a wattmeter 17 or its equivalent connected to measure the power flow in the tie line 1. This wattmeter may be provided with a pointer or movable control member 18 which through suitable amplifying means modulates or biases the primary speed responsive means of the speed governor. As shown by way of example, this amplifying means comprises a torque motor 19 whose rotor has fastened thereto a transverse lever 20 attached to the link 13 by means of a secondary link 21. The torque motor 19 may be of any suitable type, such as a direct-current machine having a field winding 22 which is separately excited by any suitable source of direct current. The rotor or armature 23 is energized from a variable-voltage direct-current generator 24 driven by any suitable means, such as a shunt motor 24'. An adjustable inductance 26 for providing controllable time delay is serially connected between the generator 24 and the torque motor armature 23. The generator 24 has a field winding 25 which is controllably energized by means of a potentiometer 27, the movable contact arm of which is the wattmeter member 18.

If desired, the wattmeter may be a thermal wattmeter so as to give the tie line controller a further amount of time delay.

The tie line controller is so adjusted that when the tie line power flow is at any predetermined normal value the wattmeter pointer 18 will be in its neutral position on the potentiometer so that the field winding 25 is not energized. Under these conditions the generator 24 develops no voltage and hence the torque motor 19 applies no torque or corrective bias to the speed governor. If, however, the tie line power departs from normal the potentiometer pointer will move off neutral so as to apply a voltage or potentiometer drop across the field winding 25. The polarity of this potential will be different depending upon whether the tie line load departure from normal is an increase or decrease. The resulting current in the field winding 25 will cause the generator 24 to produce a voltage of such polarity as to cause the torque motor effectively to either raise or lower the speed setting of the governor. Thus, a torque developed by the torque motor 19 which is in a counterclockwise direction, as viewed in the drawing, will tend to raise the speed setting of the governor whereas a clockwise torque will lower the speed setting of the governor and consequently lower the power output of the turbine 3.

In this manner any change in tie line power flow from a predetermined normal value will cause the tie line controller to change the governor setting in such direction as to cause the turbine 3 and alternator 2 to restore the tie line load to normal. For example, an increase in power flow through the tie line from alternator 4 to alternator 2 will cause the tie line controller to raise the setting of the governor for the turbine 3 thereby causing the alternator 2 to increase its power output whereby this generator takes all the change in the load on the system which caused the change in tie line power flow with the result that the tie line power flow will return to normal.

It will be observed that the more the tie line load departs from normal the greater will be the motion of the slider 18 from its neutral position and consequently the greater will be the voltage across the field winding 25 and hence the greater will be the corrective bias applied by the torque motor 19 to the governor. In fact, the corrective bias will be proportional to the tie line load deviation and that is why this tie line controller is called a proportional controller. It will be also observed that the proportional corrective bias is a continuous or steady bias so that whenever there is a tie line load deviation from normal there will be a steady or continuous and proportional corrective bias applied to the speed governor.

Like the governor, the tie line controller is also an amplifier in the sense that a small change in tie line load or watts will cause the application to the governor of a corrective bias which in terms of the resulting change in turbine power output is relatively large. For example, if the wattmeter were disconnected from the tie line 1 and if the pointer 18 were moved manually an amount corresponding to a certain tie line watt deviation, then the resulting action of the controller will apply to the governor such a bias that the resulting change in turbine power output will be many times the watt change corresponding to the motion of the slider 18. This action corresponds to the tie line controller regulation which may be defined as the ratio of any given change in tie line load when sustained to the accompanying change in governor bias in terms of prime mover load. This regulation will be referred to symbolically hereafter as $R_c$. The tie line controller also has a certain amount of time delay or time lag which may occur in the response of the slider 18 to a change in tie line watts. There is also a time delay due to the inductance of the field winding 25. Additional and adjustable time delay may also be obtained by means of the adjustable inductance 26 connected in series between the variable voltage generator 24 and the torque motor 19. The overall time lag of the controller may conveniently be designated as $T_5$.

Both the controller regulation $R_c$ and the controller time lag $T_5$ are factors of the rate of correction or rate of response of the controller. In any controller under actual working conditions the rate of correction will not be constant but will be a maximum at the beginning or immediately after a tie line load deviation and will then decrease because of the fact that the action of the controller is such as to reduce the tie line deviation and consequently the rate of correction falls off until it becomes zero when the tie line load deviation is returned to zero. However, if this drooping effect is eliminated by disconnecting the wattmeter and operating the slider 18, then a movement of the slider 18 corresponding to an arbitrary tie line watt change $\Delta P$ will in time $T_5$ seconds produce a corrective bias equivalent to $$\frac{\Delta P}{R_c}$$

The rate of correction may therefore be defined as $$\frac{\frac{\Delta P}{R_c}}{T_5}$$

which reduces to $$\frac{\Delta P}{R_c \times T_5}$$

expressed in watts per second. This is also a measure of the initial rate of response of the controller when in actual operation.

We have found that if $R_c$ times $T_5$ is less than one-fourth of the total governor time lag ($\frac{1}{4}\Sigma T_g$), instability results from the operation of the tie line controller and the synchronous generators 2 and 4 may pull out of step.

We have also found that instability may occur in the range of small governor time lags as a result of a large rate of tie line correction [small $(R_c \times T_5)$]. The appearance of this unstable condition is a function of governor regulation $R_g$ and what may be termed the inertia constant M of the regulated alternator and its prime mover. This constant M is defined as the time in seconds required by the alternator and its prime mover to come to full speed from standstill with full load torque applied. We have found that when $(R_c \times T_5)$ is less than $(M \times R_g)$ instability results and that consequently $(R_c \times T_5)$ must be kept numerically greater than $(M \times R_g)$ in order to prevent instability. In general, therefore, the maximum allowable rate of correction of the controller or, in other words, the minimum allowable $(R_c \times T_5)$, as regards system stability, is a function of the governor time lag and is also a function of the governor regulation if the governor time lag is small.

The above criteria are for setting the tie line controller at or on the stable side of the borderline of system instability. We have also found that this borderline setting does not produce minimum tie line power swings or surges and that the rate of correction of the controller has to be a definite amount less than that corresponding to the borderline of instability in order to produce minimum tie line power swings. In general, the minimum power swing will be obtained with settings less than twice the values which determine the borderline of instability. In other words, $(R_c \times T_5)$ should be less than $\frac{1}{2}\Sigma T_g$ or less than $(2M \times R_g)$, whichever is the larger.

It is sometimes considered desirable to have the proportional tie line controller produce intermittent impulses or corrective biasing effects instead of producing a continuous biasing effect. One form of intermittent type proportional controller is shown in Fig. 2. It differs from Fig. 1 in that the potentiometer 27 has been replaced by a rotating drum type controller 28 which is driven continuously by any suitable means, such as a motor 29. This drum controller is made of insulating material and has embedded in it tapered or triangular shape contact members 30 and 31. These are connected respectively to the terminals of a field winding 25' for the generator 24. This is a split field winding having its midpoint connected to one side of a source of control current. The wattmeter pointer 18 is connected to the other side of the supply source and the arrangement is so adjusted that when the tie line power is normal the pointer is midway between the tips of the contacts 30 and 31. If now the tie line power deviates from normal the pointer 18 will move to the right or left as the case may be thereby intermittently energizing one or the other half of the split field winding 25'. The greater the deviation from normal the longer the energizing impulses for the field winding 25' because due to the tapered shape of the contacts 30 and 31 the longer they will be in contact with the pointer 18. Therefore, what may be called the ratio of time on to time off or time energized to time de-energized of the field winding 25' will be proportional to the deviation of the tie line load from normal. The polarity of the generator 24 will depend upon which half of the split field winding 25' is intermittently energized.

Capacitors 32 may be connected between the contacts 30 and 31 and the contact slider or pointer 18 so as to minimize arcing of the contacts.

Except for this intermittent type of control the operation of Fig. 2 is the same as Fig. 1 and the same criteria apply for setting the controller so as to insure stability or to insure minimum tie line power swings.

In Fig. 3 the tie line controller is a so-called floating type of controller. Such a controller is characterized by producing a corrective bias at a rate which is proportional to the tie line power deviation. This may be accomplished by changing the mechanical connections between the motor 19 and the governor control member 13 so that the motor 19 is permitted to rotate continuously instead of acting merely as a torque motor. Thus, the shaft of the armature 23 may be provided with a pinion 33 for operating a rack 34 which is connected to a spring 35 which in turn is connected to the governor control mechanism or member 13. The rack and pinion gear ratio is made very large so that it is practically irreversible so that the tension of the spring 35 cannot rotate the motor and the motor will come to rest in any position when no voltage is applied to its armature regardless of the spring tension.

With this arrangement it will be seen that the speed of the motor will be proportional to the tie line deviation in watts and the speed of the motor also determines the rate of change of the corrective bias applied to the speed governor.

Such a floating controller will have zero or flat load regulation, that is to say, it will always restore the tie line watts exactly to their predetermined value. However, it does have a time constant or what may be called a rate-of-load-correction regulation $R'_c$. This may be determined in a manner similar to the way in which the regulation $R_c$ of the proportional controller is determined; namely, by disconnecting the wattmeter element and operating the pointer 18 a definite amount by hand and then measuring the time required for the controller to change the governor bias an amount equivalent to the change in wattmeter setting. In other words, the rate of correction of the floating controller will be $\Delta P/R'_c$.

It will thus be seen that $R'_c$ for the floating controller corresponds to $R_c \times T_5$ for the proportional controller and therefore $R'_c$ must be numerically greater than the larger of $\tfrac{1}{4}\Sigma T_g$ and $(M \times R_g)$ in order to prevent instability and it must be between this value and the larger of $\tfrac{1}{2}\Sigma T_g$ and $(2M \times R_g)$ in order to obtain minimum tie line power surges or power swings.

Fig. 4 shows an intermittent type of floating controller which differs from Fig. 3 in that the potentiometer 27 has been replaced by a set of contact members or plates 36 and 37 which are mounted on a reciprocating assembly 38 whose reciprocating motion is imparted thereto by an eccentric which is driven by a motor 39. The contacts 36 and 37 are connected to the terminals of the split field winding 25' for the generator 24. When the tie line watts are normal the inner ends of the contacts 36 and 37 pass on opposite sides of the pointer 18 so that no contact is made. If, however, the tie line watts depart from normal the deviation of the pointer in either direction will cause momentary contact between it and either the contacts 36 or 37 as the case may be. The greater the deviation the greater the duration of contact. These impulses to the field winding 25 energize the motor 23 intermittently in the same manner as has previously been described in connection with Fig. 2. The same criteria hold for the setting of the controller of Fig. 4 as for the controller of Fig. 3.

It is sometimes desirable to add so-called droop correcting means to the speed governor so as to improve its regulation. One means for this purpose is shown schematically as a dash pot connection 40 between the throttle rod 12 and the governor control lever 13. A spring 41 is also provided for centering the pilot valve 14 when the speed of the prime mover is normal. This dashpot connection, in effect, shifts the point of connection between the members 12 and 13 so that the throttle can assume different steady state positions without causing a corresponding change in the position of the primary speed responsive controller.

The addition of such droop correcting mechanism to the governor does not affect the principles of this invention but it does change the definition of regulation $R_g$ so that instead of defining it as the sustained change in prime mover speed from full speed which accompanies a full load change on its prime mover divided by full load speed it is the change in prime mover speed from full speed which accompanies a full load change on its prime mover divided by full speed neglecting the reduction in sustained speed change produced by the droop correcting means. In other words, the droop correcting means is relatively slow acting in comparison with the speeds of the controller and the governor and hence its action does not affect the optimum settings of the controller.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In an alternating-current power system of the type in which a pair of prime mover driven alternators are interconnected by a tie line, in combination, an automatic speed governor for one of said prime movers, said governor having a predetermined rate of response, and an automatic tie line load controller for modifying said governor, said controller having a rate of response which is adjusted in relation to the governor rate of response so as to cause minimum size power surges in said tie line as a result of a sudden load change on one of said generators, said adjustment being such that the rate of response of said controller is a definite amount smaller than that which would bring the system to the border line of instability.

2. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed, neglecting the reduction in sustained speed change produced by any droop correcting means, said last-mentioned prime mover and its alternator having an effective inertia $M$ which is numerically equal to the time in seconds its requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than the larger one of $(\tfrac{1}{4}\Sigma T_g)$ and $(M$ times $R_g)$.

3. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than $\frac{1}{4}\Sigma T_g$.

4. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than M times $R_g$.

5. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than the larger one of $\frac{1}{4}\Sigma T_g$ and M times $R_g$ and numerically smaller than the larger of $\frac{1}{2}\Sigma T_g$ and 2M times $R_g$.

6. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than $\frac{1}{4}\Sigma T_g$ and numerically smaller than $\frac{1}{2}\Sigma T_g$.

7. An alternating-current power system comprising in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than M times $R_g$ and numerically smaller than 2M times $R_g$.

8. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than the larger one of ($\frac{1}{4}\Sigma T_g$) and (M times $R_g$) by an amount sufficient to reduce to a minimum any power surges in said tie line resulting from variations in said load.

9. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full sped which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than $\frac{1}{4}\Sigma T_g$ by an amount sufficient to reduce to a minimum any power surges in said tie line resulting from variations in said load.

10. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic proportional type tie line load controller for minimizing the effect of said variable load on the tie line load comprising means responsive to deviations in tie line load from a predetermined value for applying to the governor of one of said prime movers a corrective bias which is proportional to the magnitude of said deviations, said last-mentioned governor having an overall time lag of $\Sigma T_g$ seconds and a regulation $R_g$ defined as the sustained change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a load regulation $R_c$ which is defined as the ratio of any given change in tie line load when sustained to the accompanying change in governor bias in terms of prime mover load, said controller also having a time lag $T_5$ such that $R_c$ times $T_5$ is numerically greater than M times $R_g$ by an amount sufficient to reduce to a minimum any power surges in said tie line resulting from variations in said load.

11. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in the prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate of load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than the larger of ($\frac{1}{4}\Sigma T_g$) and (M times $R_g$).

12. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate of load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than $\frac{1}{4}\Sigma T_g$.

13. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate of load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than M times $R_g$.

14. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate of load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than the larger of $\frac{1}{4}\Sigma T_g$ and (M times $R_g$) and numerically smaller than the larger of $\frac{1}{2}\Sigma T_g$ and 2M times $R_g$.

15. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in the tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting mechanism, said last-mentioned prime mover and its alternator having an effective inertia M which is numerically equal to the time in seconds it requires to come to full speed from standstill with full load torque applied, said controller having a rate-of-load-correction regulation $R'_c$ which is defined as the time in seconds it requires to change the governor bias an amount equivalent to a given power change on said last-mentioned prime mover when said controller is actuated by a sustained tie line power change of the same amount and which is numerically greater than $\frac{1}{4}\Sigma T_g$ and numerically smaller than $\frac{1}{2}\Sigma T_g$.

16. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in the tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate-of-load-correction regulation $R'_c$ which is defined as the time in seconds it requires to change the governor bias an amount equivalent to a given power change on said last-mentioned prime mover when said controller is actuated by a sustained tie line power change of the same amount and which is numerically greater than M times $R_g$ and numerically smaller than 2M times $R_g$.

17. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate-of-load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than the larger of ($\frac{1}{4}\Sigma T_g$) and (M times $R_g$) by an amount sufficient to reduce to a minimum any power surges in said tie line resulting from variations in said load.

18. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate of load correction regulation $R'_c$ which is defined as the time in seconds it requires to change the governor bias an amount equivalent to a given power change on said last-mentioned prime mover when said controller is actuated by a sustained tie line power change of the same amount and which is numerically greater than $\frac{1}{4}\Sigma T_g$ by an amount sufficient to reduce to a minimum any power surges in said tie line resulting from variations in said load.

19. An alternating-current power system comprising, in combination, at least two generating systems each including at least one prime mover and one alternator driven thereby, a separate automatic speed governor for each of said prime movers, a tie line interconnecting said generating systems, a variable load connected to said power system, and an automatic floating type tie line load controller for minimizing the effect of said variable load on the tie line load comprising means responsive to deviations in tie line load from a predetermined value for applying to the governor of one of said prime movers a corrective bias at a rate which is proportional to the magnitude of said deviations, said last-mentioned governor having an overall time lag of $\Sigma T_g$ seconds and a regulation $R_g$ defined as the change in prime mover speed from full speed which accompanies a full load change on its prime mover divided by full speed neglecting the reduction in sustained speed change produced by any droop correcting means, said last-mentioned prime mover and its alternator having an effective inertia M which is numerically equal to the time in seconds it requires to come to full speed from standstill with full load torque applied, said controller having a rate-of-load-correction regulation $R'_c$ which is defined as the time in seconds it requires to change the governor bias an amount equivalent to a given power change on said last-mentioned prime mover when said controller is actuated by a sustained tie line power change of the same amount and which is numerically greater than M times $R_g$ by an amount sufficient to reduce to a minimum any power surges in said tie line resulting from variations in said load.

SELDEN B. CRARY.
HAROLD S. SHOTT.
CHARLES CONCORDIA.